United States Patent
Murao et al.

(10) Patent No.: US 7,044,837 B2
(45) Date of Patent: May 16, 2006

(54) MAGNETIC HEAD CLEANING METHOD

(75) Inventors: Naoto Murao, Kanagawa (JP); Hiroyuki Tahara, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/694,174

(22) Filed: Oct. 28, 2003

(65) Prior Publication Data

US 2004/0137833 A1 Jul. 15, 2004

(30) Foreign Application Priority Data

Oct. 28, 2002 (JP) .......................... P. 2002-313055

(51) Int. Cl.
 *B24B 1/00* (2006.01)
(52) U.S. Cl. ........................ 451/41; 451/299; 451/307; 451/59; 428/810; 360/128
(58) Field of Classification Search .................. 451/41, 451/59, 296, 299, 306, 307; 428/810, 900; 360/128

See application file for complete search history.

(56) References Cited

U.S. PATENT DOCUMENTS

| | | | | | |
|---|---|---|---|---|---|
| 4,291,353 | A | * | 9/1981 | Fletcher et al. | 360/128 |
| 4,556,890 | A | * | 12/1985 | Hermanson et al. | 346/74.4 |
| 4,701,364 | A | * | 10/1987 | Miyoshi et al. | 428/141 |
| 5,991,127 | A | * | 11/1999 | Thiessen | 360/128 |
| 6,057,021 | A | * | 5/2000 | Ishikawa et al. | 428/65.3 |
| 6,210,775 | B1 | * | 4/2001 | Ejiri et al. | 428/141 |

* cited by examiner

Primary Examiner—Eileen P. Morgan

(74) Attorney, Agent, or Firm—Sughrue Mion, PLLC

(57) ABSTRACT

A method for cleaning a magnetic head using a cleaning tape comprising a substrate and a cleaning layer, wherein the cleaning tape has a stiffness of 2 or less in a width direction, and the magnetic head has trenches substantially parallel to a sliding direction of the cleaning tape.

11 Claims, 1 Drawing Sheet

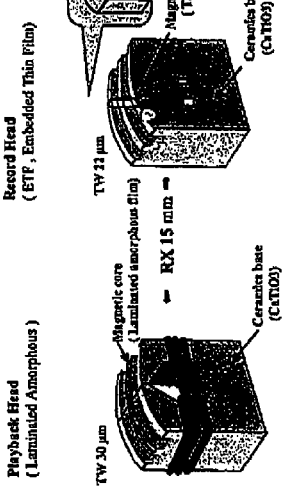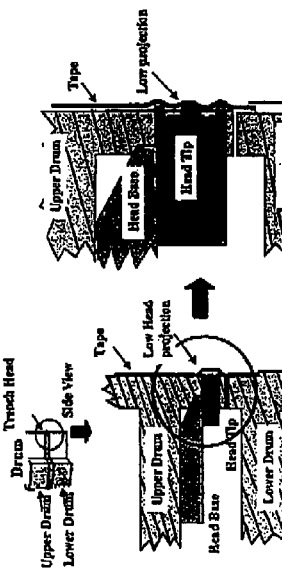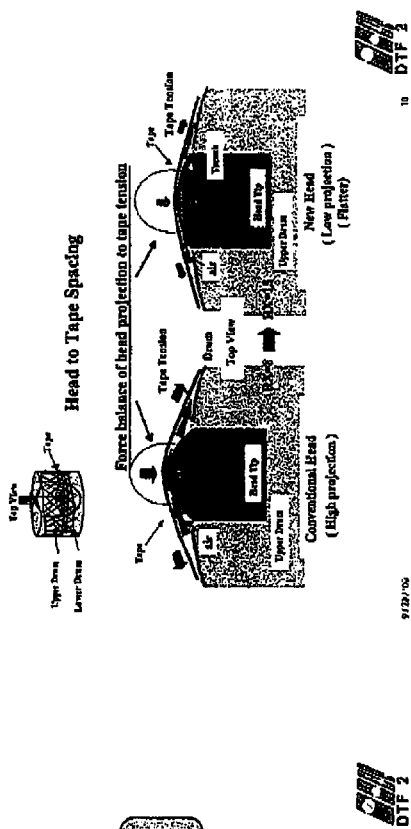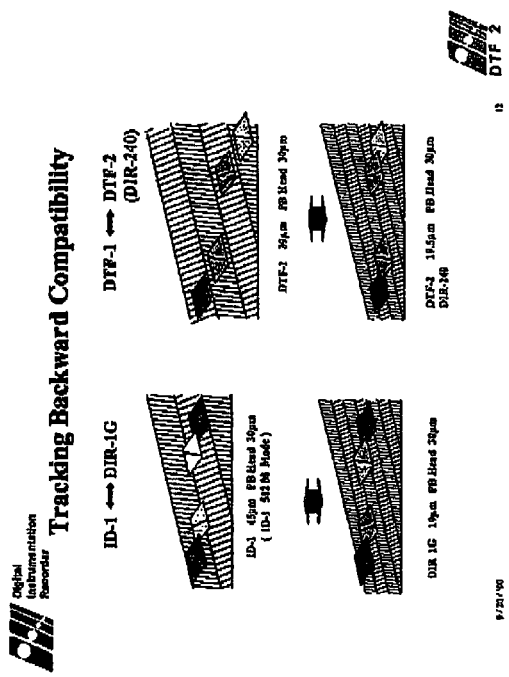

MAGNETIC HEAD CLEANING METHOD

FIELD OF THE INVENTION

This invention relates to a method of cleaning a magnetic head provided in an apparatus for recording and reproducing information on a magnetic recording medium such as video tape or data tape thereby to restore the reproduction output of the magnetic head.

BACKGROUND OF THE INVENTION

Single-layer metal particulate tapes comprising ferromagnetic metal powder and double-layer metal particulate tapes having a thinner magnetic layer and a non-magnetic layer formed by simultaneous coating and thereby exhibiting improved output have been used in the field of broadcasting. The recent spread of high image quality broadcasting including high vision broadcasting and terrestrial digital broadcasting has boosted demands for recording media having higher recording density than before. In the field of data storage, too, the information to be dealt with has ever been increasing, and a rotary-head (helical scan) format used in broadcasting has now come to be used in this field. High recording density and highly reliable backup tapes like those used for broadcasting have been desired for data storage.

To cope with these tendencies, magnetic recording media are getting more and more smooth on its magnetic layer to have an increased linear recording density, and deterioration of running durability due to an increased frictional coefficient is of concern. Thinning of recording media is inevitably necessary in order to reduce the volume recording density so as to increase recording capacity, and attendant problems of running durability, such as tape edge damage, have been getting more acute. Because it is very difficult to maintain uniform contact between a head and a tape of reduced thickness, a high strength material, such as PEN or aramid, has come to be used as a substrate for assuring tape strength. On the other hand, active research and development has also been directed to the structure of a magnetic head, and heads providing good contact with a thin tape have been adapted. For example, Sony DTF-2 drives adapt a trench head (see High Data Rate Head Tape Interface-Update, 2000, U.S.A.). The trench head is designed to efficiently allow air entrapped between a spinning head and a tape to escape through the trenches to provide good head to tape contact. However, because the magnetic core of the trench head is softer than the ridges outside the trenches and wears faster than the outer ridges, the curvature radius of the head in the width direction (the direction perpendicular to the tape sliding direction) increases rapidly. It follows that the head to tape contact is deteriorated, resulting in considerable reduction of reproduction output and increase of error rate.

In the light of these circumstances, a cleaning tape for maintaining stable head to tape contact against head wear has been desired.

SUMMARY OF THE INVENTION

An object of the present invention is to provide a tape cleaning method capable of correcting a change in curvature radius of a trench head due to wear by periodical cleaning operation.

The present invention provides a method of cleaning a magnetic head using a cleaning tape comprising a substrate and a cleaning layer, wherein the cleaning tape has a stiffness of 2 or less in the width direction, and the magnetic head has trenches substantially parallel to the cleaning tape sliding direction.

DETAILED DESCRIPTION OF THE INVENTION

As a magnetic tape gets thinner, it is more important to periodically clean a magnetic head to maintain a constant curvature radius of the head. A larger head curvature radius causes a larger distance between a head gap and a tape, which results in reduction of reproduction output due to spacing loss. In the worst case, errors would exceed the error correction limit, resulting in a failure of data reproduction.

According to the present invention, the curvature radius of a magnetic head that has increased through friction with a running magnetic recording tape can be returned nearly to the initial one by periodically cleaning the head with a cleaning tape having a stiffness of 2 or less, preferably 0.5 to 2.0. Thus, the curvature radius of a head can be maintained constant.

The stiffness of a cleaning tape in the width direction can be adjusted by any method. For example, a reduction in thickness of the substrate results in a reduction of stiffness. Too small a stiffness can cause such a problem as tape edge folding during running. The lower limit of the stiffness is decided in the light of the running performance of a magnetic recording drive.

The term "a magnetic (trench) head" as used herein is intended to include a record head, a playback head, and an erase head. The recording/reproduction mechanism of a magnetic head is not limited and includes electromagnetic induction and magnetoresistive (MR). The expression "trenches substantially parallel to the cleaning tape sliding direction" as used herein means that the trenches and the cleaning tape sliding direction are allowed to make an angle up to about 5°.

The terminology "stiffness" of the cleaning tape in the width direction denotes a stiffness value measured with a loop stiffness tester. In the measurement, a diameter of the loop stiffness tester is 2 mm, and the stiffness is defined as a load when deformation is 0.5 mm. The cleaning tape preferably has a stiffness of about 1.0 to 4.0 in the longitudinal direction.

The cleaning tape used in the present invention will then be described.

[I] Cleaning Layer

The cleaning layer may have a single layer structure or a multilayer structure. An example of the cleaning tape having a multilayer structure comprises a substrate, a lower layer, and an upper layer in the order described. The upper layer is provided on the lower layer by wet-on-wet coating or wet-on-dry coating. A nonmagnetic lower layer and a magnetic upper layer used in known magnetic recording media can be used as a lower layer and an upper layer, respectively.

[II] Ferromagnetic Metal Powder

Ferromagnetic metal powder which can be used in the cleaning layer is preferably ferromagnetic alloy powder mainly comprising α-Fe. The ferromagnetic powder may contain, in addition to prescribed atoms, Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, Sm, P, Co, Mn, Zn, Ni, Sr, B. etc. Ferromagnetic powders containing at least one of Al, Si, Ca, Y, Ba, La, Nd, Sm, Co, Ni, and B in addition to α-Fe, particularly those containing at least one of Co, Y, Al, Nd, and Sm in addition to α-Fe are preferred. A preferred Co content is up to 40 atom %, particularly 5 to 35 atom %, especially 10 to 35 atom %. A preferred Y content is 1.5 to 12 atom %, particularly 3 to 10 atom %, especially 3 to 9 atom %. A preferred Al content is 1.5 to 13 atom %, particularly 3 to 11 atom %, especially 4 to 10 atom %. The ferromagnetic metal powder can be pretreated with a dispersant, a lubricant, a surface active agent, an antistatic agent, and the like before being dispersed. Examples of suitable agents for the pretreatment are described in JP-B-44-14090, JP-B-45-18372, JP-B-47-22062, JP-B-47-22513, JP-B-46-28466, JP-B-46-38755, JP-B-47-4286, JP-B-47-12422, JP-B-47-17284, JP-B-47-18509, JP-B-47-18573, JP-B-39-10307, JP-B-46-39639, and U.S. Pat. Nos. 3,026, 215, 3,031,341, 3,100,194, 3,242,005, and 3,389,014.

The ferromagnetic metal powder may contain a small amount of a hydroxide or an oxide. The ferromagnetic metal powder can be prepared by known processes including reduction of a composite organic acid complex salt (mainly an oxalate) with a reducing gas (e.g., hydrogen); reduction of iron oxide with a reducing gas (e.g., hydrogen) into Fe or Fe—Co particles; pyrolysis of a metal carbonyl compound; reduction of a ferromagnetic metal by adding a reducing agent (e.g., sodium borohydride, a hypophosphite or hydrazine) to an aqueous solution of the ferromagnetic metal; and vaporization of a metal in a low-pressure inert gas. The resulting ferromagnetic metal powder may be subjected to a known slow oxidation treatment including immersion in an organic solvent followed by drying; immersion in an organic solvent, bubbling an oxygen-containing gas through the solvent to form an oxide film, followed by drying; and forming an oxide film in an atmosphere having a controlled oxygen to inert gas ratio.

The ferromagnetic metal powder has a BET specific surface area ($S_{BET}$) of 45 to 80 m$^2$/g, preferably 50 to 70 m$^2$/g. An $S_{BET}$ less than 45 m$^2$/m results in an increased noise. An $S_{BET}$ more than 80 m$^2$/g results in poor surface properties. The ferromagnetic metal powder has a crystallite size of 80 to 180 Å, preferably 100 to 180 Å, still preferably 110 to 175 Å. The ferromagnetic metal powder preferably has an average major axis length of 30 to 150 nm, particularly 30 to 100 nm, and an acicular ratio of 3 to 15, particularly 5 to 12. The ferromagnetic metal powder has a saturation magnetization ($\sigma s$) of 100 to 200 A·m$^2$/kg, preferably 120 to 180 A·m$^2$/kg.

The water content of the ferromagnetic metal powder is preferably adjusted to 0.01 to 2% by weight. The water content is preferably optimized depending on the kind of the binder. The pH of the ferromagnetic metal powder is usually 4 to 12, preferably 6 to 10. The pH is preferably optimized according to the kind of the binder. If desired, the ferromagnetic metal powder is surface treated with Al, Si, P or an oxide thereof so as to limit the adsorption of a lubricant such as a fatty acid to 100 mg/m$^2$ or less. The surface treating agent is usually used in an amount of 0.1 to 10% by weight based on the ferromagnetic metal powder. Although it is essentially preferred for the ferromagnetic metal powder to be free of inorganic ions, such as Na, Ca, Fe, Ni, and Sr ions, presence of up to 200 ppm of such inorganic ions is little influential on the characteristics. The ferromagnetic metal powder preferably has as low a void as possible. The void is preferably up to 20% by volume, still preferably 5% by volume or lower. As far as the above-mentioned particle size requirements are fulfilled, the powder particles may have any of a needle shape, a rice grain shape, and a spindle shape. The ferromagnetic metal powder preferably has as small a switching field distribution (SFD) as possible. A preferred SFD is 0.8 or smaller. It is preferred for the ferromagnetic metal powder to have a small coercive force (Hc) distribution. A ferromagnetic metal powder having a small Hc distribution can be obtained by using goethite having an improved particle size distribution or by preventing sintering.

[III] Lower Layer

The lower layer of the cleaning layer comprises a resin, preferably a resin having dispersed therein organic or inorganic powder. The inorganic powder is usually and preferably non-magnetic powder. Magnetic powder may also be used.

The non-magnetic powder is selected from inorganic compounds including metal oxides, metal carbonates, metal sulfates, metal nitrides, metal carbides, and metal sulfides. Examples of the inorganic compounds are α-alumina having an α-phase content of 90 to 100%, β-alumina, γ-alumina, θ-alumina, silicon carbide, chromium oxide, cerium oxide, α-iron oxide, hematite, goethite, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, and molybdenum disulfide. They can be used either individually or in combination. Preferred among them are titanium dioxide, zinc oxide, iron oxide, and barium sulfate, particularly titanium dioxide and α-iron oxide, because they can be produced with small particle size distribution and be endowed with a function through many means.

The non-magnetic powder preferably has an average particle size of 0.005 to 2 μm. If desired, non-magnetic powders different in particle size may be used in combination, or a single kind of a non-magnetic powder having a broadened size distribution may be used to produce the same effect. A still preferred average particle size of th non-magnetic powder is 0.01 to 0.2 μm. Specifically, metal oxide particles of general shape preferably have an average particle size of 0.08 μm or smaller, and acicular metal oxide particles preferably have an average major axis length of 0.3 μm or shorter, particularly 0.2 μm or shorter. The non-magnetic powder usually has a tap density of 0.05 to 2 g/ml, preferably 0.2 to 1.5 g/ml, a water content of 0.1 to 5% by weight, preferably 0.2 to 3% by weight, still preferably 0.3 to 1.5% by weight, a pH of 2 to 11, preferably 3 to 10, and a specific surface area of 1 to 100 m$^2$/g, preferably 5 to 80 m$^2$/g, still preferably 10 to 70 m$^2$/g. The non-magnetic powder preferably has a crystallite size of 0.004 to 1 μm, particularly 0.04 to 0.1 μm, a DBP (dibutyl phthalate) oil absorption of 5 to 100 ml/100 g, preferably 10 to 80 ml/100 g, still preferably 20 to 60 ml/100 g, and a specific gravity of 1 to 12, preferably 3 to 6. The particle shape may be any of acicular, spherical, polygonal and tabular shapes. The Mohs hardness is preferably 4 to 10. The SA (stearic acid) adsorption of the non-magnetic powder is in a range of 1 to 20 μmol/m$^2$, preferably 2 to 15 μmol/m$^2$, still preferably 3 to 8 μmol/m$^2$.

It is preferred that $Al_2O_3$, $SiO_2$, $TiO_2$, $ZrO_2$, $SnO_2$, $Sb_2O_3$, ZnO or $Y_2O_3$ be present on the surface of the non-magnetic powder by surface treatment. Among them, preferred for dispersibility are $Al_2O_3$, $SiO_2$, $TiO_2$, and $ZrO_2$, with $Al_2O_3$, $SiO_2$, and $ZrO_2$ being still preferred. These oxides may be used either individually or in combination. According to the purpose, a composite surface layer can be formed by co-precipitation or a method comprising first applying alumina to the non-magnetic particles and then treating the particles with silica or vise versa. The surface layer may be porous for some purposes, but a homogeneous and dense surface layer is usually preferred.

Specific examples of commercially available non-magnetic powders which can be used in the lower layer include Nanotite (from Showa Denko K.K.); HIT-100 and ZA-G1 (both from Sumitomo Chemical Co., Ltd.); α-hematite series DPN-250, DPN-250BX, DPN-245, DPN-270BX, DPN-500BX, DBN-SA1, and DBN-SA3 (from Toda Kogyo Corp.); titanium oxide series TTO-55B, TTO-55A, TTO-55B, TTO-55C, TTO-55S, and TTO-55D, SN-100, and α-hematite series 270, E271, E300, and E303 (from Ishihara Sangyo Kaisha, Ltd.); titanium oxide series STT-4D, ST-30D, STT-30, and STT-65C, and α-hematite α-40(from Titan Kogyo K.K.); MT-100S, MT-100T, MT-150W, MT-500B, MT-600B, MT-100F, and MT-500HD (from Tayca Corp.); FINEX-25, BF-1, BF-10, BF-20, and ST-M (from Sakai Chemical Industry Co., Ltd.); DEFIC-Y and DEFIC-R (from Dowa Mining Co., Ltd.); AS2BM and TiO2P25 (from Nippon Aerosil Co., Ltd.); and 100A and 500A (from Ube Industries, Ltd.) and calcined products thereof. Preferred of them are titanium dioxide and α-iron oxide.

Carbon black can be incorporated into the lower layer to produce known effects, i.e., reduction of surface resistivity Rs and reduction of light transmission. Useful carbon black species include furnace black for rubber, thermal black for rubber, carbon black for colors, and acetylene black. The characteristics of carbon black to be used, including those described below, should be optimized according to an intended effect. Combined use of different kinds of carbon black can bring about enhancement of the effect.

The carbon black in the lower layer has a specific surface area of 100 to 500 $m^2/g$, preferably 150 to 400 $m^2/g$, a DBP oil absorption of 20 to 400 ml/100 g, preferably 30 to 400 ml/100 g, an average particle size of 5 to 80 nm, preferably 10 to 50 nm, still preferably 10 to 40 nm. The carbon black preferably has a pH of 2 to 10, a water content of 0.1 to 10% by weight, and a tap density of 0.1 to 1 g/ml.

Specific examples of commercially available carbon black for use in the lower layer include Black Pearls 2000, 1300, 1000, 900, 800, 880, and 700, and Vulcan XC-72 (from Cabot Corp.); #3050B, #3150B, #3250B, #3750B, #3950B, #950, #650B, #970B, #850B, MA-600, MA-230, #4000, and #4010 (from Mitsubishi Chemical Corp.); Conductex SC, RAVEN 8800, 8000, 7000, 5750, 5250, 3500, 2100, 2000, 1800, 1500, 1255, 1250 (from Columbian Carbon); and Ketjen Black EC (from Akzo Nobel Chemicals). Carbon black having been surface treated with a dispersant, etc., resin-grafted carbon black, or carbon black with its surface partially graphitized may b used. Carbon black may previously been dispersed in a binder before being added to a coating composition. Carbon black is used in an amount of 50% by weight or less based on the above-described inorganic powder and 40% by weight or less based on the total weight of the lower layer. The above-recited carbon black species can be used either individually or as a combination thereof. In selecting carbon black species for use in the present invention, reference can be made, e.g., in Carbon Black Kyokai (ed.), *Carbon Black Binran*.

The lower layer can contain organic powder according to the purpose. Useful organic powders include acrylic-styrene resin powders, benzoquanamine resin powders, melamine resin powders, and phthalocyanine pigments. Polyolefin resin powders, polyester resin powders, polyamide resin powders, polyimide resin powders, and polyethylene fluoride resin powders are also usable. Methods of preparing these resin powders are disclosed, e.g., in JP-A-62-18564 and JP-A-60-255827.

With respect to the other techniques involved in forming the lower layer, e.g., selection of the kinds and amounts of binder resins, lubricants, dispersants, additives, and solvents and methods of dispersion, known techniques as for a magnetic layer applies.

[IV] Binder

Binders which can be used in the cleaning layer (inclusive of the lower and upper layers) include conventionally known thermoplastic resins, thermosetting resins and reactive resins, and mixtures thereof. The thermoplastic resins used as a binder usually have a glass transition temperature of −100 to 150° C., an number average molecular weight of 1,000 to 200,000, preferably 10,000 to 100,000, and a degree of polymerization of about 50 to 1000.

Such thermoplastic resins include homo- or copolymers containing a unit derived from vinyl chloride, vinyl acetate, vinyl alcohol, maleic acid, acrylic acid, an acrylic ester, vinylidene chloride, acrylonitrile, methacrylic acid, a methacrylic ester, styrene, butadiene, ethylene, vinyl butyral, vinyl acetal, a vinyl ether, etc.; polyurethane resins, and various rubber resins. Useful thermosetting or reactive resins include phenolic resins, epoxy resins, thermosetting polyurethane resins, urea resins, melamine resins, alkyd resins, reactive acrylic resins, formaldehyde resins, silicone resins, epoxy-polyamide resins, polyester resin/isocyanate prepolymer mixtures, polyester polyol/polyisocyanate mixtures, and polyurethane/polyisocyanate mixtures. For the details of these resins, *Plastic Handbook*, Asakura Shoten (publisher) can be referred to. Known electron beam (EB)-curing resins can also be used in each layer. The details of the EB-curing resins and methods of producing them are described in JP-A-62-256219. The above-recited resins can be used either individually or as a combination thereof. Preferred resins are a combination of a polyurethane resin and at least one vinyl chloride resin selected from polyvinyl chloride, a vinyl chloride-vinyl acetate copolymer, a vinyl chloride-vinyl acetate-vinyl alcohol copolymer, and a vinyl chloride-vinyl acetate-maleic anhydride copolymer and a combination of the above-described combination and polyisocyanate.

The polyurethane resin includes those of known structures, such as polyester polyurethane, polyether polyurethane, polyether polyester polyurethane, polycarbonate polyurethane, polyester polycarbonate polyurethane, and polycaprolactone polyurethane.

In order to ensure dispersing capabilities and durability, it is preferred to introduce into each of the above-recited binder resins at least one polar group by copolymerization or through addition reaction, the polar group being selected from —COOM, —$SO_3M$, —$OSO_3M$, —P=$O(OM)_2$, —O—P=$O(OM)_2$ (wherein M is a hydrogen atom or an alkali metal base), —OH, —$NR_2$, —$N^+R_3$ (wherein R is a hydrocarbon group), an epoxy group, —SH, —CN, and the like. The amount of the polar group to be introduced is $10^{-1}$ to $10^{-8}$ mol/g, preferably $10^{-2}$ to $10^{-6}$ mol/g.

Examples of commercially available binder resins which can be used in the lower and the upper layers are VAGH, VYHH, VMCH, VAGF, VAGD, VROH, VYES, VYNC, VMCC, XYHL, XYSG, PKHH, PKHJ, PKHC, and PKFE (from Union Carbide Corp.); MPR-TA, MPR-TA5, MPR-TAL, MPR-TSN, MPR-TMF, MPR-TS, MPR-TM, and MPR-TAO (from Nisshin Chemical Industry Co., Ltd.); 1000w, DX80, DX81, DX82, DX83, and 100FD (from Denki Kagaku Kogyo K.K.); MR-104, MR-105, MR110, MR100, MR555, and 400X-110A (from Zeon Corp.); Nipporan N2301, N2302, and N2304 (from Nippon Polyurethane Industry Co., Ltd.); Pandex T-5105, T-R3080, and T-5201, Barnock D-400 and D-210-80, and Crisvon 6109 and 7209 (from Dainippon Ink & Chemicals, Inc.); Vylon UR8200, UR8300, UR-8700, RV530, and RV280 (from Toyobo Co., Ltd.); Daiferamin 4020, 5020, 5100, 5300, 9020, 9022, and7020 (from Dainichiseika Color & Chemicals Mfg. Co., Ltd.); MX5004 (from Mitsubishi Chemical Corp.); Sanprene SP-150 (from Sanyo Chemical Industries, Ltd.); and Saran F310 and F210 (from Asahi Chemical Industry Co., Ltd.).

The binder is used in the lower and upper layers in an amount of 5 to 50% by weight, preferably 10 to 30% by weight, based on the non-magnetic powder and the magnetic powder, respectively. Where a vinyl chloride resin, a polyurethane resin, and polyisocyanate are used in combination, their amounts are selected from a range of 5 to 30% by weight, a range of 2 to 20% by weight, and a range of 2 to 20% by weight, respectively. In case where head corrosion by a trace amount of released chlorine is expected to occur, polyurethane alone or a combination of polyurethane and polyisocyanate can be used. The polyurethane to be used preferably has a glass transition temperature of −50 to 150° C., preferably 0 to 100° C., an elongation at break of 10 to 2000%, a stress at rupture of 0.05 to 10 kg/mm$^2$ (0.49 to 98 Mpa), and a yield point of 0.05 to 10 kg/mm$^2$ (0.49 to 98 Mpa).

Where the cleaning layer has a multilayer structure, the two or more layers can have different binder compositions in terms of the binder content, the proportions of a vinyl chloride resin, a polyurethane resin, polyisocyanate, and other resins, the molecular weight of each resin, the amount of the polar group introduced, and other physical properties of the resins. It is rather desirable to optimize the binder design for each layer. For the optimization, known techniques relating to a non-magnetic/magnetic multilayer structure can be utilized. For example, to increase the binder content of the upper layer is effective to reduce scratches on the upper layer, or to increase the binder content of the lower layer is effective to increase flexibility thereby to smooth head touch.

The polyisocyanate which can be used in the cleaning layer includes tolylene diisocyanate, 4,4'-diphenylmethane diisocyanate, hexamethylene diisocyanate, xylylene diisocyanate, naphthyelene-1,5-diisocyanate, o-toluidine diisocyanate, isophorone diisocyanate, and triphenylmethane triisocyanate. Further included are reaction products between these isocyanate compounds and polyols and polyisocyanates produced by condensation of the isocyanates. Examples of commercially available polyisocyanates which can be used in the invention are Coronate L, Coronate HL, Coronate 2030, Coronate 2031, Millionate MR, and Millionate MTL (from Nippon Polyurethane Industry Co., Ltd.); Takenate D-102, Takenate D-110N, Takenate D-200, and Takenate D-202 (from Takeda Chemical Industries, Ltd.); and Desmodur L, Desmodur IL, Desmodur N, and Desmodur HL (from Sumitomo Bayer Urethane Co., Ltd.). They can be used in each layer, either alone or as a combination of two or more thereof taking advantage of difference in curing reactivity.

[V] Carbon Black and Abrasive

The carbon black which can be used in the upper layer includes furnace black for rubber, thermal black for rubber, carbon black for colors, and acetylene black. The carbon black preferably has a specific surface area of 5 to 500 m$^2$/g, a DBP oil absorption of 10 to 400 ml/100 g, an average particle size of 5 to 300 nm, a pH of 2 to 10, a water content of 0.1 to 10% by weight, and a tap density of 0.1 to 1 g/ml.

Specific examples of commercially available carbon black which can be used in the cleaning layer include Black Pearls 2000, 1300, 1000, 905, 800, and 700, and Vulcan XC-72 (from Cabot Corp.); #80, #60, #55, #50, and #35 (from Asahi Carbon Co., Ltd.); #2400B, #2300, #900, #1000, #30, #40, and #10B (from Mitsubishi Chemical Corp.); Conductex SC, RAVEN 150, 50, 40, and 15, and RAVE-MT-P (from Columbian Carbon); and Ketjen Black EC (from Nippon EC). Carbon black having been surface treated with a dispersant, etc., resin-grafted carbon black, or carbon black with its surface partially graphitized may be used. Carbon black may previously been dispersed in a binder before being added to a magnetic coating composition. The above-recited carbon black species can be used either individually or as a combination thereof. The carbon black, if added, is preferably used in an amount of 0.1 to 30% by weight based on the magnetic powder. Carbon black serves for antistatic control, reduction of frictional coefficient, reduction of light transmission, film strength enhancement, and the like. These functions vary depending on the species. Accordingly, it is possible, or rather desirable, to optimize the kinds, amounts, and combinations of the carbon black species for each layer according to the intended purpose with reference to the above-mentioned characteristics, such as particle size, oil absorption, conductivity, pH, and so forth. In selecting carbon black species for use in the cleaning layer, reference can be made, e.g., in Carbon Black Kyokai (ed.), *Carbon Black Binran*.

Known abrasives mostly having a Mohs hardness of 6 or higher can be incorporated into the upper layer. Such abrasives include α-alumina having an α-phase content of 90% or more, β-alumina, silicon carbide, chromium oxide, cerium oxide, α-iron oxide, corundum, silicon nitride, silicon carbide, titanium carbide, titanium oxide, silicon dioxide, boron nitride, and artificial diamond. These abrasives can be used either individually or as a mixture thereof or as a composite thereof (an abrasive surface treated with another). Existence of impurity compounds or elements, which are sometimes observed in the abrasives, will not affect the effect as long as the content of the main component is 90% by weight or higher. The abrasives preferably have an average particle size of 0.01 to 2 μm. It is desirable for the abrasives to have a narrow size distribution. In order to improve durability, abrasives different in particle size may be used in combination, or a single kind of an abrasive having a broadened size distribution maybe used to produce the same effect. The abrasives preferably have a tap density of 0.3 to 2 g/ml, a water content of 0.1 to 5% by weight, a pH of 2 to 11, and a specific surface area of 1 to 30 m$^2$/g. The abrasive grains may be needle-like, spherical or cubic. Angular grains are preferred for high abrasive performance.

Examples of commercially available abrasives which can be used are AKP-12, AKP-15, AKP-20, AKP-30, AKP-50, HIT-20, HIT-30, HIT-55, HIT-60, IHT-70, HIT-80, and HIT-100 (from Sumitomo Chemical Co., Ltd.); ERC-DBM, HP-DBM, and HPS-DBM (from Reynolds Metals Co.); WA10000 (from Fujimi Kenmazai K.K.); UB 20 (from Uyemura & CO., LTD); G-5, Chromex U2, and Chromex U1 (from Nippon Chemical Industrial Co., Ltd.); TF100 and TF140 (from Toda Kogyo Corp.); Beta-Random Ultrafine (from Ibiden Co., Ltd.); and B-3 (from Showa Mining Co., Ltd.).

If necessary, the abrasive can also be incorporated into the lower layer thereby to control the surface profile of the coating layer or the projecting conditions of the abrasive grains on the coating layer. It is a matter of course that the particle size and the amount of the abrasive added to the upper layer and the lower layer should be optimized.

[VI] Additives

The upper and lower layers can contain additives capable of producing lubricating effects, antistatic effects, dispersing effects, plasticizing effects, and the like. Such additives include molybdenum disulfide, tungsten graphite disulfide, boron nitride, graphite fluoride, silicone oils, polar group-containing silicones, fatty acid-modified silicones, fluorine-containing silicones, fluorine-containing alcohols, fluorine-containing esters, polyolefins, polyglycols, alkylphosphoric esters and their alkali metal salts, alkylsulfuric esters and their alkali metal salts, polyphenyl ethers, phenylphosphonic acid, α-naphtylphosphoric acid, phenylphosphoric acid, diphenylphosphoric acid, p-ethylbenzenephosphonic acid, phenylphosphinic acid, aminoquinones, various silane coupling agents, titan coupling agents, fluorine-containing alkylsulfuric esters and their alkali metal salts, saturated or unsaturated and straight-chain or branched monobasic fatty acids having 10 to 24 carbon atoms and their metal (e.g., Li, Na, K, Cu) salts, saturated or unsaturated and straight-chain or branched mono- to hexahydric alcohols having 12 to 22 carbon atoms, saturated or unsaturated and straight-chain or branched alkoxyalcohols having 12 to 22 carbon atoms, mono-, di- or tri-esters between the above-described monobasic fatty acids and one of saturated or unsaturated and straight-chain or branched mono- to hexahydric alcohols having 2 to 12 carbon atoms, fatty acid esters of polyalkylene oxide monoalkyl ethers, fatty acid amides having 8 to 22 carbon atoms, and aliphatic amines having 8 to 22 carbon atoms.

Examples of the fatty acids are capric acid, caprylic acid, lauric acid, myristic acid, palmitic acid, stearic acid, behenic acid, oleic acid, elaidic acid, linoleic acid, linolenic acid, and isostearic acid. Examples of the esters are butyl stearate, octyl stearate, amyl stearate, isooctyl stearate, butyl myristate, octyl myristate, butoxyethyl stearate, butoxydiethyl stearate, 2-ethylhexyl stearate, 2-octyldodecyl palmitate, 2-hexyldodecyl palmitate, isohexadecyl stearate, oleyl oleate, dodecyl stearate, tridecyl stearate, oleyl erucate, neopentyl glycol didecanoate, and ethylene glycol dioleate. Examples of the alcohols are oleyl alcohol, stearyl alcohol, and lauryl alcohol.

Surface active agents are also useful additives. Suitable surface active agents include nonionic ones, such as alkylene oxide types, glycerol types, glycidol types, and alkylphenol ethylene oxide adducts; cationic ones, such as cyclic amines, ester amides, quaternary ammonium salts, hydantoin derivatives, heterocyclic compounds, phosphonium salts, and sulfonium salts; anionic ones containing an acidic group, such as a carboxyl group, a sulfonic acid group, a phosphoric acid group, a sulfuric ester group or a phoshoric ester group; and amphoteric ones, such as amino acids, aminosulfonic acids, amino alcohol sulfuric or phosphoric esters, and alkyl betaines. For the details of the surface active agents, refer to *Kaimen Kasseizai Binran* published by Sangyo Tosho K.K. The above-recited lubricants, antistatic agents, and like additives do not always need to be 100% pure and may contain impurities, such as isomers, unreacted materials, by-products, decomposition products, and oxides. The proportion of the impurities is preferably 30% by weight at the most, still preferably 10% by weight or less.

Since the physical actions of these additives vary among individuals, the kind and amount of an additive or the mixing ratio of additives used in combination for producing a synergistic effect should be determined so as to produce optimum results according to the purpose. The following is a few examples of manipulations using additives. (1) Bleeding of fatty acid additives is suppressed by using fatty acids having different melting points between the upper layer and the lower layer. (2) Bleeding of ester additives is suppressed by using esters different in boiling point, melting point or polarity between the upper layer and the lower layer. (3) Coating stability is improved by adjusting the amount of a surface active agent. (4) The amount of the lubricant in the lower layer is increased to improve the lubricating effect. The total amount of the lubricants to be used in the upper or lower layer is generally selected from a range of 0.1 to 50% by weight, preferably 2 to 25% by weight, based on the magnetic or non-magnetic powder, respectively.

All or part of the additives can be added at any stage of preparing a coating composition. For example, the additives can be blended with the magnetic powder before kneading, be mixed with the magnetic powder, the binder, and a solvent in the step of kneading, or be added during or after the step of dispersing or immediately before coating. The purpose of using an additive could be achieved by applying a part of, or the whole of, the additive on the cleaning layer surface either by simultaneous coating or successive coating, which depends on the purpose. A lubricant could be applied to the cleaning layer surface even after slitting, which depends on the purpose.

Known organic solvents, e.g., those described in JP-A-6-68453, can be used in the preparation of a coating composition.

[VII] Layer Structure

The thickness of the substrate on which the cleaning layer is provided is preferably in a range of 4 to 10 μm, preferably 6 to 9 μm. An undercoating layer for adhesion improvement may be provided between the substrate and the lower layer. The undercoating layer usually has a thickness of 0.005 to 0.5 μm, preferably 0.01 to 0.5 μm. The cleaning tape may have a backcoating layer on the back side of the substrate. The backcoating layer usually has a thickness of 0.1 to 1 μm, preferably 0.3 to 0.7 μm. Conventional compositions can be used to form the undercoating layer and the backcoating layer.

The thickness of the upper layer is usually 0.01 to 3 μm, preferably 0.05 to 0.3 μm. The thickness of the lower layer is usually 0.2 to 5.0 μm, preferably 0.3 to 3.0 μm, still preferably 0.5 to 2.5 μm.

[VIII] Substrate

The substrate of the cleaning tape is preferably non-magnetic. Known films, such as polyesters (e.g., polyethylene terephthalate and polyethylene naphthalate), polyolefins, cellulose triacetate, polycarbonate, polyamides (including aliphatic polyamides and aromatic polyamides, e.g., aramid), polyimide, polyamide-imide, polysulfone, and polybenzoxazole, can be used. High strength substrates of polyethylene naphthalate or polyamide are preferred. If desired, a laminate substrate, such as the one disclosed in JP-A-3-224127, can be used to provide different surface profiles between the magnetic layer side and the backside. The substrate maybe subjected to surface treatment, such as corona discharge treatment, plasma treatment, treatment for easy adhesion, heat treatment, and dustproof treatment.

In order to accomplish the object of the invention, it is desirable to use a substrate having a mean plane average roughness (SRa) of 12.0 nm or smaller, preferably 8.0 nm or smaller, as measured with a three-dimensional profilometer TOPO-3D, supplied by Wyko. It is preferred for the substrate to have not only a small average roughness but no peaks of 0.3 μm or higher. The surface profile is controlled freely by the size and amount of fillers added to the substrate. Useful fillers include oxides and carbonates of Ca, Si, Ti, etc. and organic fine powders of acrylic resins, etc. The surface profile of the substrate preferably has a maximum height $SR_{max}$ of 1 µm or smaller, a 10 point average roughness $SR_z$ of 0.5 µm or smaller, a maximum peak-to-mean plane height $SR_p$ of 0.5 µm or smaller, a maximum mean plane-to-valley depth $SR_v$ of 0.5 µm or smaller, a mean plane area ratio SSr of 10 to 90%, and an average wavelength $S\lambda_a$ of 5 to 300 µm. The peak distribution of the substrate surface profile can be controlled freely by the filler to obtain desired electromagnetic characteristics and durability. The number of peaks of 0.01 to 1 µm is controllable between 0 and 2000 per 0.1 mm².

The substrate preferably has an F-5 value of 5 to 50 kg/mm² (49 to 490 Mpa), a thermal shrinkage of 0.5% or less, particularly 0.2% or less, at 80° C.×30 minutes, and a breaking strength of 5 to 100 kg/mm² (≈49 to 980 MPa).

[IX] Method of Preparing Cleaning Tape

The method of preparing the upper and lower layer coating compositions includes at least the steps of kneading and dispersing and, if desired, the step of mixing which is provided before or after the step of kneading and/or the step of dispersing. Each step may be carried out in two or more divided stages. Any of the materials, including the magnetic powder, non-magnetic powder, binder, carbon black, abrasive, antistatic, lubricant, and solvent, can be added at the beginning of or during any step. Individual materials may be added in divided portions in two or more steps. For example, polyurethane may be added dividedly in the kneading step, the dispersing step, and a mixing step which is provided for adjusting the viscosity of the dispersion. Known techniques for coating composition preparation can be applied as a part of the method. The kneading step is preferably performed using a kneading machine with high kneading power, such as an open kneader, a continuous kneader, a pressure kneader, and an extruder. In using a kneader, the magnetic or non-magnetic powder, part (preferably at least 30% of the total binder) or the whole of the binder, and 15 to 500 parts by weight of a solvent per 100 parts by weight of the magnetic or non-magnetic powder are kneaded. For th details of the kneading operation, reference can be made in JP-A-1-106338 and JP-A-1-79274. In the step of dispersing, glass beads can be used to disperse the magnetic or non-magnetic mixture. Zirconia beads, titania beads or steel beads, which are high-specific-gravity dispersing media, are suitable. The size and mixing ratio of the dispersing medium should be optimized. Known dispersing machines can be used.

The cleaning tape having a double layer structure is preferably produced by the following coating methods.

(a) A method comprising forming a lower layer by using a coating apparatus generally employed for a magnetic coating composition, such as a gravure coater, a roll coater, a blade coater or an extrusion coater, and applying an upper layer coating composition while the lower layer coating composition is wet by means of an extrusion coating apparatus disclosed in JP-B-1-46186, JP-A-60-238179, and JP-A-2-265672 which is of the type in which a substrate is pressed while coated.

(b) A method in which the lower layer coating composition and the upper layer coating composition are applied almost simultaneously through a single coating head disclosed in JP-A-63-88080, JP-A-2-17971, and JP-A-2-265672, the coating head having two slits through which the respective coating compositions pass.

(c) A method in which the lower layer composition and the upper layer composition are applied almost simultaneously by means of an extrusion coating apparatus disclosed in JP-A-2-174965, the apparatus being equipped with a back-up roll.

In order to prevent magnetic particles from agglomerating, it is advisable to give shear to the coating composition in the coating head. The techniques taught in JP-A-62-95174 and JP-A-1-236968 are suited for shear application. The coating compositions should satisfy the viscosity requirement specified in JP-A-3-8471. A successive coating manner in which an upper layer coating composition is applied after a lower layer coating composition is dried is also applicable without impairing the effects of the invention. However, the above-mentioned simultaneous coating systems are recommended to reduce coating defects and thereby to obtain uniform quality.

EXAMPLES

The present invention will now be illustrated in greater detail with reference to Examples, but it should be understood that the invention is not construed as being limited thereto. Unless otherwise noted, all the parts and percents are by weight.

Example 1

| Upper layer coating composition: | |
|---|---|
| Ferromagnetic metal powder | 100 parts |
| Fe/Co = 70/30 (atomic ratio); Al/Fe = 11 atom %; | |
| Y/Fe = 7 atom %; coercive force Hc: | |
| 2450 Oe (≈194 kA/m); | |
| average major axis length: 0.08 µm; σs: 145 A · m²/kg; | |
| crystallite size: 150 A; $S_{BET}$ : 53 m²/g | |
| Vinyl chloride copolymer MR110 (from Zeon Corp.) | 10 parts |
| Polyurethane resin UR8200 (from Toyobo Co., Ltd.) | 3 parts |
| Carbon black #50 (from Asahi Carbon Co., Ltd.) | 3 parts |
| Phenylphosphonic acid | 3 parts |
| Butyl stearate | 2 parts |
| Butoxyethyl stearate | 3 parts |
| Neopentyl glycol | 3 parts |
| Stearic acid | 1 part |
| Methyl ethyl ketone | 180 parts |
| Cyclohexanone | 110 parts |

| Lower layer coating composition: | |
|---|---|
| Non-magnetic powder (α-iron oxide) | 100 parts |
| $S_{BET}$: 50 m²/g; pH: 8.9; DEP oil absorption: 27 to | |
| 38 ml/100 g; surface layer: 1% Al₂O₃ based on the | |
| particles | |
| Carbon black #950B (from Mitsubishi Chemical) | 13 parts |
| Vinyl chloride copolymer MP110 | 17 parts |
| Polyurethane resin UR8200 | 6 parts |
| Phenylphosphonic acid | 3 parts |
| Butyl stearate | 3 parts |
| Butoxyethyl stearate | 4 parts |
| Neopentyl glycol | 4 parts |
| Oleic acid | 1 part |
| Stearic acid | 1 part |
| Methyl ethyl ketone | 200 parts |
| Cyclohexanone | 50 parts |

The components of each coating composition were kneaded in a kneader. To the resulting dispersion was added an α-alumina paste (SLH160 available from Sumitomo Chemical Co., Ltd.; a paste of α-alumina HIT60 from Sumitomo Chemical in a vinyl chloride copolymer MR110 from Zeon) in an amount of 25 parts in terms of α-alumina.

Polyisocyanate was added to the dispersion for the upper layer and the dispersion for the lower layer in an amount of 5 part sand 13 parts, respectively. Forty parts of cyclohexanone was added to each dispersion, followed by filtration through a filter having an average pore size of 3 μm to prepare an upper layer coating composition and a lower layer coating composition.

The resulting lower layer coating composition and upper layer coating composition were applied in this order almost simultaneously to a 6 μm thick polyethylene naphthalate film (substrate) and dried to form a lower layer having a thickness of 2.0 μm and an upper layer having a dry thickness of 0.3 μm. A known backcoating composition comprising carbon black powder and a binder was applied to the back side of the film to a dry thickness of 0.5 μm and dried. The coated film was slit into ½ in. wide strips. The strip was wound on a reel for Sony DTF-2 tapes to prepare a cleaning tape.

A commercially available DTF-2 tape was run on a Sony DTF-2 drive for 500 hours, and the reproduction output (A) at the shortest recording wavelength was measured. Then the cleaning tape was run on the drive for 10 seconds, and the reproduction output (B) at the shortest recording wavelength was measured again. The output difference (B−A) was taken as a measure of output restoration by the cleaning tape. The output restoration thus obtained is shown in Table 1 together with the stiffness of the cleaning tape in the width direction.

Example 2

A cleaning tape was prepared in the same manner as in Example 1, except for using a 4.5 μm thick polyethylene naphthalate film as a substrate. An output restoration of the cleaning tape was measured in the same manner as in Example 1.

Comparative Example 1

A cleaning tape was prepared in the same manner as in Example 1, except for using a 7.0 μm thick polyethylene terephthalate film as a substrate. An output restoration of the cleaning tape was measured in the same manner as in Example 1.

Comparative Example 2

A cleaning tape was prepared in the same manner as in Example 1, except for using a 8.5 μm thick polyethylene terephthalate film as a substrate. An output restoration of the cleaning tape was measured in the same manner as in Example 1.

Comparative Example 3

A cleaning tape was prepared in the same manner as in Example 1, except for using a 9.8 μm thick polyethylene terephthalate film as a substrate. An output restoration of the cleaning tape was measured in the same manner as in Example 1.

TABLE 1

|  | Stiffness (width direction) | Output Restoration (dB/10 sec) |
|---|---|---|
| Example 1 | 1.8 | +1.0 |
| Example 2 | 1.3 | +1.5 |
| Comp. Example 1 | 2.2 | −0.1 |
| Comp. Example 2 | 2.8 | −0.3 |
| Comp. Example 3 | 4.8 | −0.5 |

It is seen from Table 1 that the head cleaning method of the present invention using a cleaning tape having a width direction stiffness of 2 or less is clearly superior to the cleaning method of Comparative Examples using a cleaning tape having a width direction stiffness exceeding 2.

The present invention provides a method of cleaning a trench head of a magnetic recording apparatus to restore the output of the head. The method comprises running a cleaning tape having a cleaning layer on one side of a substrate and having a stiffness of 2 or less in the width direction on the magnetic recording apparatus in place of a magnetic recording tape.

This application is based on Japanese Patent application JP 2002-313055, filed Oct. 28, 2002, the entire content of which is hereby incorporated by reference, the same as if set forth at length.

What is claimed is:

1. A method for cleaning a magnetic head using a cleaning tape comprising a substrate and a cleaning layer, wherein the cleaning tape has a stiffness of 2 or less in a width direction, and the magnetic head has trenches substantially parallel to a sliding direction of the cleaning tape.

2. The method for cleaning a magnetic head according to claim 1, wherein the cleaning tape has a stiffness of 0.5 to 2.0 in a width direction.

3. The method for cleaning a magnetic head according to claim 1, wherein the cleaning tape has a stiffness of 1.0 to 4.0 in a longitudinal direction.

4. The method for cleaning a magnetic head according to claim 1, wherein the substrate has a thickness of 4 to 10 μm.

5. The method for cleaning a magnetic head according to claim 1, wherein the substrate has a thickness of 6 to 9 μm.

6. The method for cleaning a magnetic head according to claim 1, wherein the cleaning layer comprises carbon black.

7. The method for cleaning a magnetic head according to claim 1, wherein the cleaning layer comprises a ferromagnetic metal powder.

8. The method for cleaning a magnetic head according to claim 1, wherein the substrate has a mean plane average roughness of 12.0 nm or smaller.

9. The method for cleaning a magnetic head according to claim 1, wherein the substrate has no peaks of 0.3 μm or higher at a surface thereof.

10. The method for cleaning a magnetic head according to claim 1, wherein the cleaning layer comprises an upper layer and a non-magnetic lower layer between the upper layer and the substrate, with the lower layer containing inorganic powder and a binder.

11. The method for cleaning a magnetic head according to claim 1, wherein the cleaning layer has a thickness of from 0.05 to 0.3 μm.

* * * * *